(No Model.)

I. B. OAKLEY.
KINDERGARTEN GAME FOR TEACHING SPELLING.

No. 364,845. Patented June 14, 1887.

WITNESSES:
J. D. [Larfield]
C. Sedgwick

INVENTOR:
I. B. Oakley
BY Munn & Co
ATTORNEYS.

UNITED STATES PATENT OFFICE.

IMOGEN B. OAKLEY, OF PITTSBURG, PENNSYLVANIA.

KINDERGARTEN GAME FOR TEACHING SPELLING.

SPECIFICATION forming part of Letters Patent No. 364,845, dated June 14, 1887.

Application filed March 18, 1887. Serial No. 231,405. (No model.)

*To all whom it may concern:*

Be it known that I, IMOGEN B. OAKLEY, of Pittsburg, in the county of Allegheny and State of Pennsylvania, have invented a new and Improved Game, of which the following is a full, clear, and exact description.

This invention consists in a game designed for the amusement of children and for their instruction, more particularly in the art of spelling and the assorting of letters to match, both in color and shape or style, with others in a printed copy or book designating certain illustrated objects in the copy or book, substantially as hereinafter described, and pointed out in the claim.

Reference is to be had to the accompanying drawings, forming a part of this specification, in which similar letters of reference indicate corresponding parts in both figures.

Figure 1:
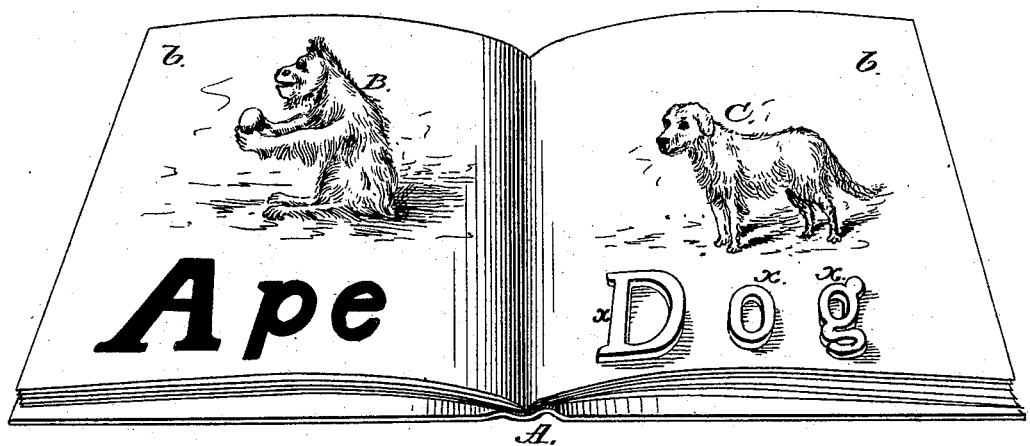
Figure 2:

Figure 1 represents a view of an open book having certain objects illustrated and the names of said objects printed beneath or adjacent to them, but with the name upon one of the exposed sheets as covered by cut or stamped letters made to register with the letters of the printed name and corresponding to them in style and other respects. Fig. 2 is a view of a few more of the cut or stamped letters used in the game, and arranged to spell the name of another illustrated object in the copy or book.

A is the copy or book, the pages or leaves *b b* of which have different illustrated objects, preferably colored pictures, on them, two only of which, however, are here shown, the one, B, representing an ape, and the other, C, a dog, with the words "Ape" and "Dog" printed in bold and separate letters beneath them.

Any other objects, with the names designating them, may be used instead of those shown, and each leaf or page of the book is designed to have a different object, animate or inanimate, illustrated on it, together with its name in print.

Any desired style and color of letter may be used in expressing the names of the illustrated objects in the copy or book. Corresponding, however, in style, color, size, and shape to the printed letters in the copy or book designating the illustrated objects therein are any number of loose cut or stamped letters, *x*—say two sets of capitals and four or more sets of italics. These cut or stamped letters may be made of any suitable material, so as to give them a separate body form; but they should be fac-similes of the printed letters in the copy or book and must register with them.

The game may be played either by the instructor or one party to the game calling out the object to be spelled, and allowing the child to select from the loose cut or stamped letters those which spell the name of said object, and afterward to place them in registered position over the printed name designating said object in the copy or book, as shown at the right hand of Fig. 1; or the copy or book may be laid before the child, and he or she may select from the loose cut or stamped letters those which correspond as regards the capital letter and italics and in color or other respects the printed name of the object in the copy or book, as shown in Fig. 2, for one of the illustrated objects, and afterward place the selected cut or stamped letters in registered position over the like but printed letters designating the object in the copy or book, as hereinbefore described in the reference to Fig. 1. In either case the correct spelling of the name and the application of it to the illustrated object spelled will by the placing of the registering cut or stamped letters on the printed letters in the copy or book be very thoroughly impressed upon the mind of the child. Likewise instruction will be given in the assortment of letters and in colors, where the letters differ in color, as well as much amusement and pleasure be afforded the child.

Having thus described my invention, what I claim as new, and desire to secure by Letters Patent, is—

In a game for the amusement and instruction of children, the combination, with a copy or book having illustrated objects and the name of each object in printed letters upon the sheet or leaf on which the object is delineated, of a series of detached cut or stamped letters constructed to form fac-similes of the printed letters in the copy or book naming the objects and to register with them, essentially as described.

IMOGEN B. OAKLEY.

Witnesses:
S. B. CARROLL,
J. H. SIMPSON.